United States Patent [19]

Steinkraus

[11] Patent Number: 4,496,462
[45] Date of Patent: * Jan. 29, 1985

[54] ANCHORING DEVICE

[76] Inventor: Richard W. Steinkraus, 5111 Willowbrook La., Lakeland, Fla. 33803

[*] Notice: The portion of the term of this patent subsequent to Jul. 5, 2000 has been disclaimed.

[21] Appl. No.: 541,965

[22] Filed: Oct. 14, 1983

Related U.S. Application Data

[63] Continuation-in-part of Ser. No. 541,127, Oct. 12, 1983, which is a continuation-in-part of Ser. No. 497,117, May 23, 1983, which is a continuation of Ser. No. 341,074, Jan. 20, 1982, Pat. No. 4,391,706.

[51] Int. Cl.³ .................... B01D 33/24; B01D 33/34
[52] U.S. Cl. .................... 210/232; 210/330; 210/344; 210/345; 210/450; 210/541
[58] Field of Search ............ 210/232, 234, 328, 330, 210/331, 333.01, 333.1, 344, 345, 346, 347, 450, 460, 461, 483, 486

[56] References Cited

U.S. PATENT DOCUMENTS

| Re. 24,150 | 5/1956 | Delruelle | 210/203 |
|---|---|---|---|
| 2,888,142 | 5/1959 | Roos | 210/450 |
| 3,080,063 | 3/1963 | Krynski | 210/330 |
| 3,139,404 | 6/1964 | Stock | 210/232 |
| 3,216,576 | 11/1965 | Roos | 210/330 |
| 3,288,296 | 11/1966 | Hirs | 210/232 |
| 3,289,840 | 12/1966 | Kahn | 210/232 |
| 3,300,048 | 1/1967 | Pollock | 210/232 |
| 3,426,909 | 2/1969 | Garner | 210/344 |
| 3,463,320 | 8/1969 | Patterson | 210/232 |
| 3,483,978 | 12/1969 | Kracklauer | 210/232 |
| 3,491,886 | 1/1970 | Glos | 210/232 |
| 4,139,472 | 2/1979 | Simonson | 210/232 |
| 4,179,378 | 12/1979 | Borre | 210/232 |
| 4,391,706 | 7/1983 | Steinkraus | 210/232 |

Primary Examiner—Ernest G. Therkorn
Attorney, Agent, or Firm—Frijouf, Rust & Pyle

[57] ABSTRACT

An anchoring device for anchoring a grid relative a frame member of a filter pan is disclosed. The anchoring device comprises an aperture defined by the grid. An open topped housing is rigidly connected to the grid with the open top of the housing registering with the aperture. An orifice is defined by the base of the housing and an inverted U-shaped strap removably extends through the orifice. The strap is rigidly secured to a cantilevered bracket which is rigidly connected to the frame member. A tapered surface cooperates with the strap and is removably wedged between the strap and the base of the housing.

18 Claims, 8 Drawing Figures

U.S. Patent  Jan. 29, 1985  Sheet 1 of 2  4,496,462
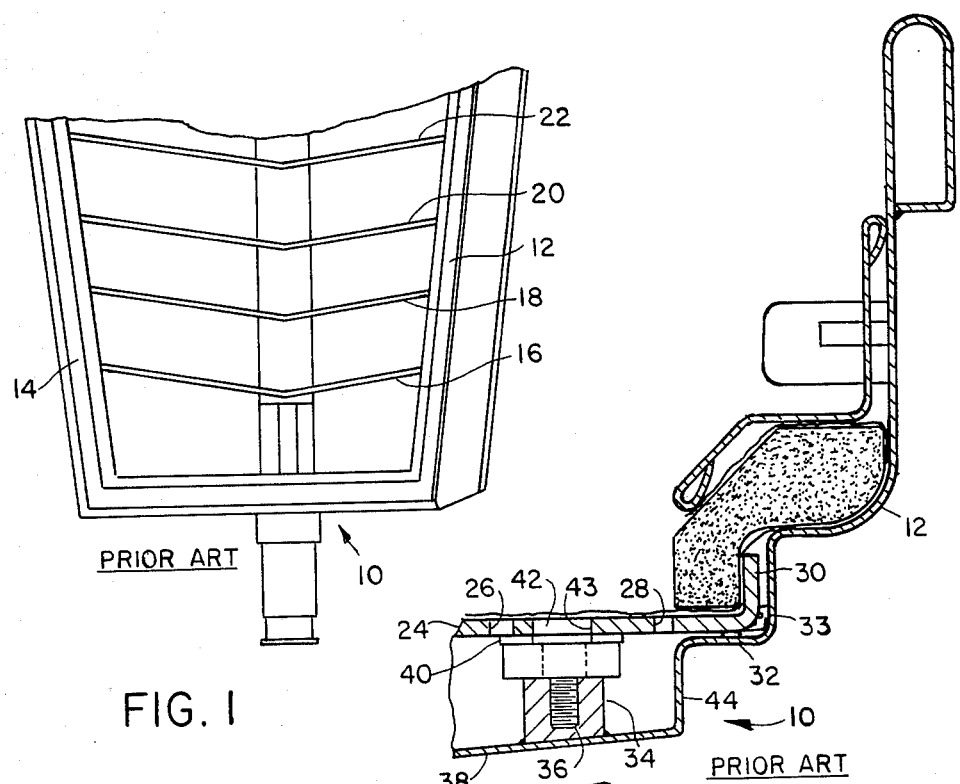
FIG. 1 PRIOR ART
FIG. 2 PRIOR ART
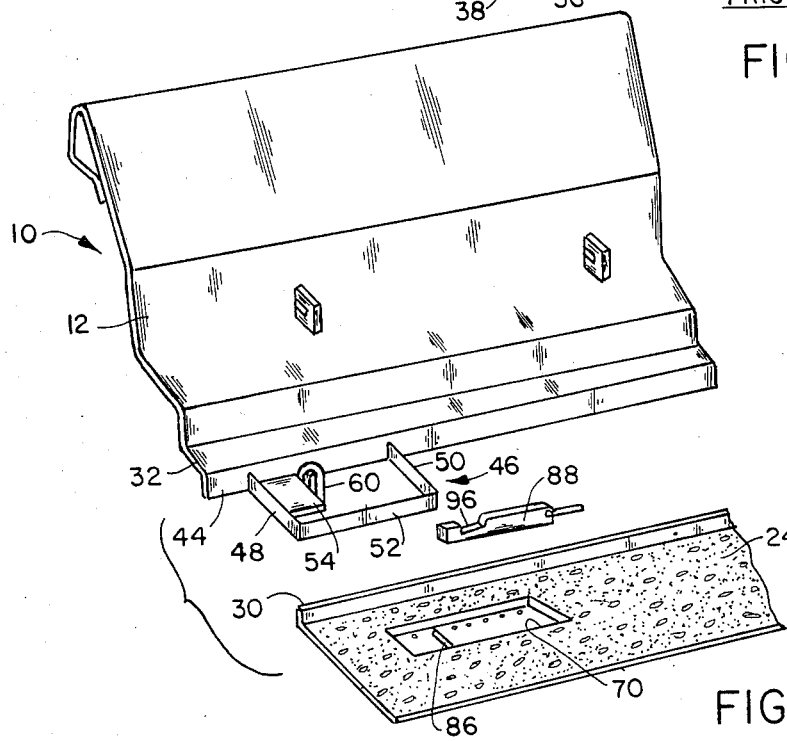
FIG. 3

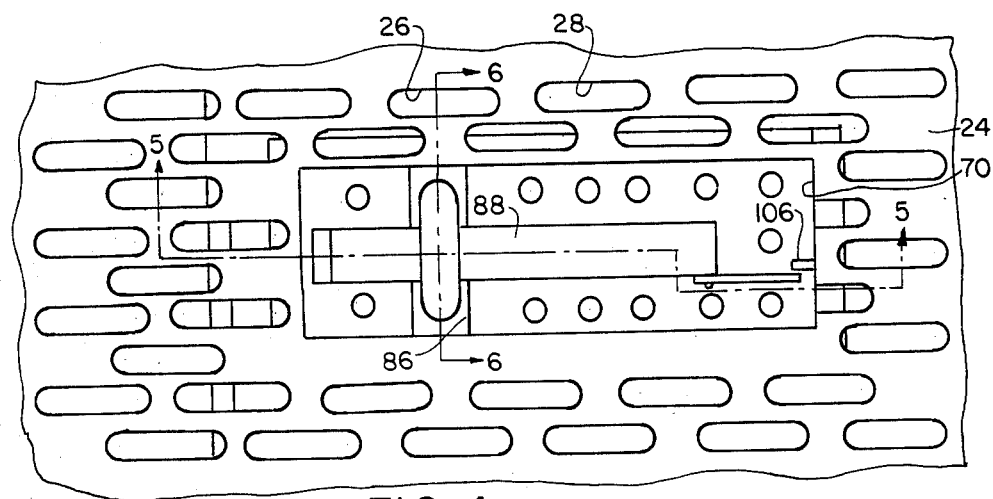
FIG. 4
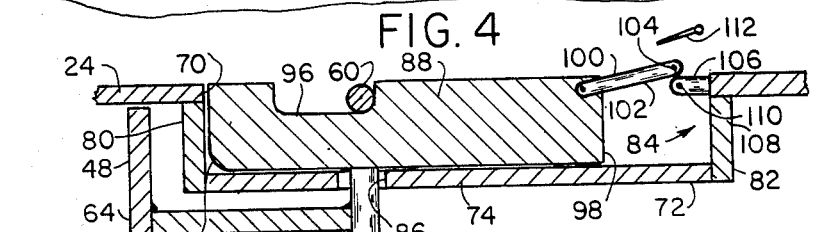
FIG. 5
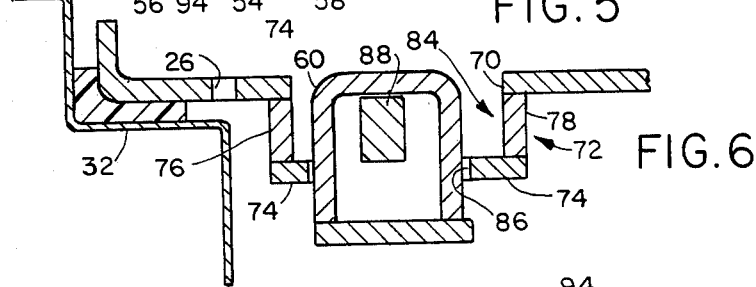
FIG. 6
FIG. 7
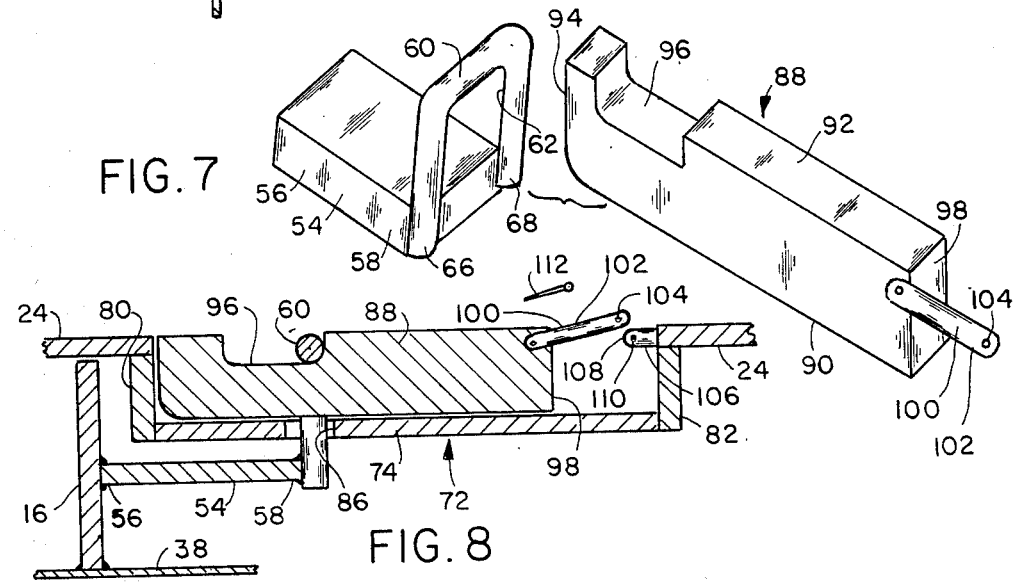
FIG. 8

ANCHORING DEVICE

CROSS REFERENCE TO RELATED APPLICATIONS

This is a continuation-in-part of copending application Ser. No. 541,127, filed Oct. 12, 1983, which is a continuation-in-part of copending application Ser. No. 497,117 filed May 23, 1983 which is a continuation of application Ser. No. 341,074 filed Jan. 20, 1982, now U.S. Pat. No. 4,391,706 issued July 5, 1983. All prior patent applications are hereby incorporated by reference into the present specification.

BACKGROUND OF THE INVENTION

1. Field of the Invention

This invention relates to an anchoring device for anchoring a grid relative a frame member of a filter pan. More particularly, this invention relates to an anchoring device for anchoring a grid relative the sidewall or a grid bar of a filter pan used in the production of phosphates.

2. Information Disclosure Statement

Because of the ever increasing demand for phosphates as agricultural soil fertilizers, the manufacture of phosphates from phosphoric ore has become a major industry. Various processes have been employed in obtaining phosphates from the phosphoric ores but these processes generally fall into two categories. First, the elemental phosphorus process and second, the wet acid process. The wet acid process involves crushing and grading raw phosphate rock known as Fluorapatite and treating this crushed rock with an acid such as sulfuric acid to obtain a single, super-phosphate which is a mixture of calcium sulfate and monocalcium phosphate.

In the wet acid process, the crushed Fluorapatite is treated with sulfuric acid in a digester. Slurry from the digester is then fed to a filtration unit where phosphoric acid is separated from the calcium sulfate precipitate. This separation is carried out by the application of partial vacuum applied to the underside of the filter element.

A typical filtration unit utilized in the phosphate industry for the separation of calcium sulfate is of generally circular configuration. The filtration unit includes twenty-four filter pan cells of substantially trapezoidal shape arranged as partial sectors of the circular filtration unit. Each filter pan cell is provided with means to enable the pan to rotate about a radial axis of the circular unit.

The filter pans are driven about a vertical axis of the circular unit so that each filter pan will progressively pass through various stations. At the first station, the pan is filled with feed slurry from the digester. When the pan has been filled, partial vacuum is applied to the underside of the filter element to draw off an undiluted mother liquor, which is phosphoric acid. At the next station, the filter pan, which now contains a filter cake of calcium sulfate, is sprayed with a weak wash liquor returned from the operation performed on the filter cake at the next station. Vacuum is again applied to the underside of the filter element to draw off the strong wash liquor having a concentration of phosphoric acid less than the undiluted mother liquor extracted at the first station. During the next station, wash water is applied to the calcium sulfate filter cake while vacuum is applied to extract a weak wash liquor which is returned to the second station for spraying onto the filter cake. The next station includes rotation of the filter pan cell to invert the pan to empty the filter cake therefrom. At this station, instead of a vacuum, air is blown through the underside of the filter element to dislodge the filter cake. At the following station, water is sprayed upwardly into the inverted filter pan to clean the pan of calcium sulfate precipitate. The pan is then dried and ready to receive the next supply of slurry from the digester.

The above filtration unit thus operates on a continuous basis with filter pans rotating through all of the above stations every 3 to 5 minutes. After prolonged usage of the filter pan, there is a tendency for a build-up of corrosive calcium sulfate precipitate that becomes lodged between the filter grid and the filter pan sidewalls. The same build-up of precipitate occurs between the grid and the grid bars. Because of this build-up, the efficiency with which the filter pan can operate is impaired and the rate at which air can pass through the grid is decreased. Therefore, it becomes necessary for the grid to be periodically removed from the filter pan to permit the calcium sulfate to be chiseled out of the filter pan and removed from the same. It will be evident to those skilled in the art that such removal of the grid from the filter pan presents serious problems.

First, the whole filter unit must be shut down to permit removal of the grid from the filter pan. This shutdown of the filter unit obviously interrupts production of phosphates. Second, because of the corrosive nature of the calcium sulfate precipitate, removal of the bolts from the filter pan to allow disengagement of the grid from the pan often results in bolts snapping within the filter pan.

Usually the base of the filter pan is provided with a plurality of internally threaded bosses. The bosses are welded to the base of the filter pan and the grid is laid over the top of the bosses. The edges of the grid fit within the area defined by the sidewalls of the filter pan. Apertures defined by the grid register with the internally threaded bosses such that bolts can be inserted through the apertures to threadably engage the bosses. When a threaded bolt snaps within the boss, it becomes necessary to ream out the bore of the boss to remove the broken end of the bolt. The oversize bore must then be internally threaded and an oversize bolt must be provided to cooperate with the replacement threaded bore. All of these operations are extremely time-consuming and not only result in high cost of maintenance, but also results in a considerable loss in production.

The present invention overcomes the aforementioned inadequacies of the known anchoring devices by providing a tapered or tapered pin which cooperates with a strap secured to the filter pan. The tapered pin effectively wedges between the strap and the base of a housing secured to the grid.

The anchoring device of the present invention provides a quickly released mechanism for anchoring the grid onto a filter pan. The anchoring device requires no special tools for installation and reliably secures the grid to the filter pan even when subjected to prolonged vibration. Therefore, it is the primary object of this invention to provide an anchoring device for anchoring a grid relative a frame member of a filter pan which overcomes the aforementioned inadequacies of the prior art devices and provides an improvement which significantly contributes to the ease with which a grid can be removed from a filter pan for cleaning purposes.

A further object of the present invention is the provision of a tapered pin which cooperates with an inverted U-shaped strap which is rigidly secured to either the sidewall of the filter pan or a grid bar of the same.

A further object of the present invention is the provision of an open topped housing which is rigidly secured to the grid with the open top of the housing registering with an aperture defined by the grid.

A further object of the present invention is the provision of an orifice defined by the base of the housing, the orifice removably receiving therein the inverted strap such that when the strap is inserted through the orifice, the tapered pin is inserted through the strap to wedge the pin between the strap and the base of the housing.

A further object of the present invention is the provision of a box-shaped housing having an open top which is of the same dimensions as the aperture of the grid.

A further object of the present invention is the provision of a cantilevered bracket having a first and a second end, the first end being rigidly secured to a grid bar and the second end being rigidly secured to the free ends of the U-shaped strap.

A further object of the present invention is the provision of a cantilevered bracket having a first and a second end, the first end being rigidly secured to a framework which is rigidly secured to a sidewall of the filter pan. The second end of the cantilevered bracket is rigidly secured to the free ends of the U-shaped strap.

A further object of the present invention is the provision of a tapered pin having a bottom surface which cooperates with the base of the housing and a top surface including a tapered surface which cooperates with the U-shaped strap.

Another object of the present invention is the provision of a forward end of the bottom surface of the tapered pin, the forward end being curved for permitting the engagement of the forward end of the tapered pin between the U-shaped strap and the base of the housing.

Another object of the present invention is the provision of a locking link pivotably secured to the rearward end of the tapered pin, the locking link defining at the distal end thereof a hole which aligns with a complimentary hole defined by an extension of the grid. The holes of the locking link and the extension of the grid are aligned when the tapered pin is wedged between the U-shaped strap and the base of the housing and a locking pin is inserted through the aligned holes to lock the link and the tapered pin in the wedged position.

The foregoing has outlined some of the more pertinent objects of the invention. These objects should be construed to be merely illustrative of some of the more prominent features and applications of the intended invention. Many other beneficial results can be attained by applying the disclosed invention in a different manner or modifying the invention within the scope of the disclosure. Accordingly, other objects and a fuller understanding of the invention may be had by referring to the summary of the invention and the detailed description describing the preferred embodiment in addition to the scope of the invention defined by the claims taken in conjunction with the accompanying drawings.

This invention should not be construed as limited to an anchoring device for anchoring a grid to the frame member of a filter pan for the production of phosphates, but should include other applications in which a grid should be easily removable from the framework of a filter pan or the like.

SUMMARY OF THE INVENTION

The invention is defined by the appended claims with a specific embodiment shown in the attached drawings. For the purpose of summarizing the invention, the invention may be incorporated into a filter pan for anchoring the grid to the frame member of the pan. The invention includes an aperture defined by the grid and an open topped housing rigidly connected to the grid. The open top of the housing registers with the grid aperture. An orifice is defined by the base of the housing and an inverted U-shaped anchoring strap is rigidly connected to the frame member. The anchoring strap removably extends through the orifice and a tapered means cooperates with the strap such that the tapered means is removably wedged between the strap and the base of the housing.

In a more specific embodiment of the invention, the grid aperture is rectangular in configuration and has the same dimensions as the open top of the housing. A cantilevered bracket includes a first and a second end thereof, the first end being rigidly secured to the grid bar and the second end being rigidly secured to the free ends of the U-shaped strap. In an alternative embodiment of the invention, the first end of the cantilevered bracket is rigidly secured to a framework which is rigidly secured to the sidewall of the filter pan.

In both embodiments of the present invention, the tapered means includes a bottom surface which cooperates with the base of the housing. The forward end of the bottom surface is curved to permit the engagement of the forward end of the tapered pin between the anchoring strap and the base of the housing. The top surface of the tapered pin includes a tapered surface which cooperates with the anchoring strap for wedging the tapered pin between the strap and the base of the housing. The forward end of the bottom surface is curved to permit the engagement of the forward end of the tapered pin between the anchoring strap and the base of the housing. The rearward end of the tapered pin includes a locking link which is pivotably secured to the rearward end of the tapered pin. The distal end of the locking link defines a first hole which is aligned with a second hole defined by an extension of the grid. The first and second holes align with each other when the tapered pin is wedged between the strap and the base. In the wedged position, a locking pin is inserted through the aligned holes for locking the link and the tapered pin in the wedged position.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which:

FIG. 1 is a fragmentary top plan view of a typical filter pan used in the phosphate industry;

FIG. 2 is a fragmentary sectional view of a prior art anchoring device showing an internally threaded boss welded to the base of the filter pan and a bolt threadably engaged within the boss to hold the grid against the sidewall of the pan;

FIG. 3 is an exploded view of the anchoring device according to one embodiment of the present invention;

FIG. 4 is a top plan view of the anchoring device shown in FIG. 3 with the tapered pin wedged between the U-shaped strap and the base of the housing;

FIG. 5 is a sectional view taken on line 5—5 of FIG. 4;

FIG. 6 is a sectional view taken on line 6—6 of FIG. 4;

FIG. 7 is a perspective view of the cantilevered bracket and inverted U-shaped strap and shows the tapered surface of the tapered pin; and FIG. 8 is a sectional view similar to that shown in FIG. 5, but shows the same anchoring device when used to anchor the grid to a grid bar of the filter pan.

Similar reference numerals refer to similar parts throughout the several views of the drawings.

DETAILED DESCRIPTION

FIG. 1 is a top plan view of part of a typical prior art filter pan used for the manufacture of phosphates. The filter pan is generally designated 10 and includes sidewalls 12 and 14 respectively. A plurality of grid bars 16, 18, 20 and 22 extend obliquely across the filter pan between the sidewalls 12 and 14.

FIG. 2 is a fragmentary sectional view of the filter pan shown in FIG. 1. FIG. 2 shows the grid 24 having a plurality of slots 26 and 28 to permit removal of liquid from the feed slurry within the pan. The grid 24 includes an upstanding edge 30 which is supported by a ledge 32 formed in the sidewall 12. A boss 34 having a threaded bore 36 is welded to the base 38 of the filter pan 10. The top of the boss 34 includes an enlarged head 40 for supporting the grid 24. A headed bolt 42 is inserted through an aperture 43 defined by the grid 24 and threadably engages the bore 36 to anchor the grid 24 against the boss 34.

FIG. 3 is an exploded view of the anchoring device of the present invention. The sidewall 12 of the filter pan 10 is shown in part together with the ledge 32. However, a depending rim 44 of the sidewall 12 has a framework, generally designated 46, welded thereto. The framework 46 includes a first and a second spaced arm 48 and 50 respectively, which are welded to the rim 44. A bridging member 52 extends between the distal ends of the arms 48 and 50. A cantilevered bracket 54, shown more particularly in FIG. 5, includes a first and a second end thereof, 56 and 58 respectively. The first end 56 of the bracket 54 is welded to the arm 48. An inverted U-shaped anchoring strap 60 is welded to the second end 58 of the cantilevered bracket 54 such that the U-shaped strap 60 defines a space 62, as shown in FIG. 7, for the reception of a tapered pin to be described hereinafter. The first end 56 of the bracket 54 is specifically welded to the lower portion 64 of the arm 48 and the depending free arms 66 and 68 of the U-shaped strap 60 as shown in FIG. 7 are welded to the second end 58 of the bracket 54.

The grid 24 defines an aperture 70 of rectangular configuration. A housing generally designated 72 is shown more particularly in FIGS. 5 and 6 and includes a base 74. A first and a second sidewall of the housing 76 and 78 respectively, are welded to the base 74 such that the sidewalls 76 and 78 are spaced parallel relative each other. A first and a second end wall 80 and 82 of the housing 72 are shown particularly in FIG. 5. The end walls 80 and 82 and the sidewalls 76 and 78 define therebetween an opening generally designated 84 which is of the same dimension and registers with the aperture 70 of the grid 24. The sidewalls 76 and 78 and the endwalls 80 and 82 are welded to the grid 24 adjacent the aperture 70. The base 74 defines an orifice 86 which is positioned such that when the grid 24 is fitted in the filter pan 10, the U-shaped strap 60 extends through the orifice 86.

A tapered pin generally designated 88 is shown more particularly in FIG. 7 and includes a bottom surface 90 and a top surface 92 spaced from the bottom surface 90. A forward end 94 of the bottom surface 90 is curved to permit engagement of the tapered pin 88 within the U-shaped anchoring strap 60. The top surface 92 of the tapered pin 88 includes a tapered surface 96 which slopes upwardly from the forward end 94 to the rearward end 98 of the tapered pin 88. The tapered surface 96 of the tapered pin 88 is defined by the top surface 92 and is recessed relative the top surface 92. A locking link 100 is pivotably secured to the rearward end 98 of the tapered pin 88 and the distal end 102 of the link 100 defines a first hole 104. An extension 106 of the grid 24 is shown more particularly in FIGS. 5 and 8. The extension 106 is welded to the grid 24 adjacent the second end wall 82 of the housing 72. The distal end 108 of the extension 106 defines a second hole 110 which aligns with the first hole 104 of the link 100 when the tapered pin 88 is wedged between the strap 60 and the base 74. A locking pin shown as a cotter pin 112 is inserted through the holes 104 and 110 when these holes are aligned to lock the tapered pin 88 and the link 100 in the wedged position.

In operation of the anchoring device, the grid 24 is positioned within the filter pan 10 with the peripheral edge of the grid 24 being supported by the ledge 32 through an intermediate resilient sealing member 33 and the various grid bars 16, 18, 20, and 22. The upstanding U-shaped strap 60 registers with the orifice 86 in the base 74 of the housing 72. With the strap correctly located through the various orifices 86 provided at spaced intervals over the area of the grid 24, the tapered pin 88 is inserted through the opening 62 of the strap 60. The forward end 94 of the tapered pin 88 is hooked under the strap 60 through the opening 62. The tapered pin 88 is then moved axially along the base 74 of the housing in the direction toward the end wall 80. As the tapered pin moves along the base 74, the tapered surface 96 of the tapered pin 88 engages the strap 60 and the tapered pin 88 becomes wedged between the strap 60 and the base 74. When the tapered pin is wedged in this position, the locking link 100 is pivoted to align the holes 104 and 110. The locking pin 112 is inserted through the aligned holes 104 and 110 to lock the tapered pin 88 in the locked position.

When the grid 24 is to be removed from the filter pan 10, the locking pin 112 is removed and the tapered pin is pulled towards the end wall 82 and removed from the housing 72. The grid 24 and attached housing 72 can then be readily removed from the filter pan 10.

It will be evident to those skilled in the art that the present invention provides an anchoring device that makes removal of a grid from a filter pan a very simple operation requiring no special tools. Furthermore, the operation can be carried out with minimal interruption relative to the production of phosphates.

A plurality of anchoring devices as described hereinbefore are disposed at spaced intervals over the entire area of the grid 24. The anchoring device of the present invention greatly facilitates the ease with which a filter pan can be cleaned as compared to the time consuming operation involved when using prior art devices. The present invention provides an anchoring device having no corrodable threads such as have rendered many prior art devices inoperable.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

10—Filter pan
12—Sidewall of 10
14—Sidewall of 10
16—Grid bar
18—Grid bar
20—Grid bar
22—Grid bar
24—Grid
26—Slot of grid
28—Slot of grid
30—Upstanding edge
32—Ledge
34—Boss
36—Threaded bore
38—Base of 10
40—Enlarged head of 34
42—Headed bolt
44—Depending rim of 12
46—Framework
48—First Arm
50—Second Arm
52—Bridge member
54—Cantilevered bracket
56—First end of 54
58—Second end of 54
60—Anchoring strap
62—Space of 60
64—Lower surface of 48
66—Depending free arm of 60
68—Depending fee arm of 60
70—Aperture of 24
72—Housing
74—Base
76—First sidewall of 72
78—Second sidewall of 72
80—First end wall of 72
82—Second end wall of 72
84—Opening
86—Orifice
88—Tapered or tapered pin
90—Bottom surfaces of 88
92—Top surface of 88
94—Forward end of 88
96—Tapered surface
98—Rearward end of 88
100—Locking link
102—Distal end of 100
104—First hole of 100
106—Extension of 24
108—Distal end of 106
110—Second hole of 106
112—Locking pin

What is claimed is:

1. An anchoring device for anchoring a grid relative a frame member of a filter pan, comprising in combination:
   an aperture defined by said grid;
   an open topped housing rigidly connected to said grid, said open top of said housing registering with said aperture;
   an orifice defined by said housing;
   anchoring means rigidly connected to the frame member of the filter pan for extending through said orifice in said housing; and
   tapered means disposed between said anchoring means and said housing for securing said grid to said frame.

2. An anchoring device as set forth in claim 1, wherein said aperture is rectangular in configuration.

3. An anchoring device as set forth in claim 1 wherein said open topped housing is a box-shaped structure, said open top of said housing having dimensions identical to the dimensions of said aperture.

4. An anchoring device as set forth in claim 1, wherein said open topped housing further includes:
   a base;
   a first and a second sidewall, said sidewalls being spaced substantially parallel relative each other;
   a first and a second end wall, said end walls being spaced substantially parallel relative each other; and
   an opening defined by said side and said end walls, said opening being of the same dimensions as the dimensions of said aperture.

5. An anchoring device as set forth in claim 4, wherein said sidewalls and said end walls are welded relative each other.

6. An anchoring device as set forth in claim 4, wherein said tapered means further includes:
   a bottom surface, which cooperates with said base;
   a top surface disposed opposite said bottom surface; and
   a tapered surface defined by said top surface, said tapered surface cooperating with said anchoring means for wedging said tapered pin between said anchoring means and said base.

7. An anchoring device as set forth in claim 6, wherein said bottom surface of said tapered means further includes:
   a forward end, said forward end being curved for permitting the engagement of said forward end of said tapered means between said anchoring means and said base: and
   a rearward end spaced from said forward end.

8. An anchor device as set forth in claim 7, further including:
   a locking link, pivotally secured to said rearward end of said tapered pin;

a first hole defined by the distal end of said locking link;

an extension of the grid, said extension being rigidly secured to the grid and disposed adjacent said housing;

a second hole defined by said extension, said second hole aligning with said first hole when said tapered pin is wedged between said anchoring means and said base;

a locking pin for insertion through said aligned holes for locking said link and said tapered means in the wedged position thereof.

9. An anchoring device as set forth in claim 4, wherein said orifice is defined by said base.

10. An anchoring device as set forth in claim 1, wherein said open topped housing is of stainless steel.

11. An anchoring device as set forth in claim 10, wherein said open topped housing is welded relative the grid.

12. An anchoring device as set forth in claim 1, wherein said anchoring means is an inverted U-shaped strap.

13. An anchoring device as set forth in claim 12, further including:

a cantilevered bracket, said bracket being rigidly secured relative the frame member;

a first and a second end of said bracket, said first end being rigidly secured relative the frame member, said second end being rigidly secured relative the free ends of said U-shaped strap.

14. An anchoring device as set forth in claim 13, wherein the frame member is a grid bar of the filter pan.

15. An anchoring device as set forth in claim 12, further including:

a cantilevered bracket;

a first and a second end of said bracket, said second end being rigidly connected to the free ends of said U-shaped strap;

a framework rigidly connected to the frame member, said first end of said bracket being rigidly connected to said framework.

16. An anchoring device as set forth in claim 15 wherein the frame member is a sidewall of the filter pan.

17. An anchoring device for anchoring a grid relative a frame member of a filter pan, comprising in combination:

an aperture defined by the grid;

an open topped housing rigidly connected to the grid, said open top of said housing registering with said aperture;

an orifice defined by said housing;

an anchoring strap rigidly connected to the frame member for anchoring said housing relative the frame member of the filter pan, said strap extending through said orifice, and a tapered means for cooperating with said anchoring strap and said tapered means being removably wedged between said anchoring strap and said housing.

18. An anchoring device for anchoring a grid relative a frame member of a filter pan, comprising in combination:

an aperture defined by the grid;

an open topped housing rigidly connected to the grid, said open top of said housing registering with said aperture;

an orifice defined by said housing;

an anchoring strap of inverted U-shaped configuration rigidly connected to the frame member of the filter pan for anchoring said housing relative the frame member, said strap removably extending through said orifice;

tapered means for cooperating with said anchoring strap, said tapered means being removably wedged between said anchoring strap and said housing; and a tapered surface of said tapered means, said tapered surface cooperating with said strap to wedge said tapered pin between said strap and said housing.

* * * * *